United States Patent
Kushnir, Jr. et al.

[11] Patent Number: 6,135,573
[45] Date of Patent: *Oct. 24, 2000

[54] 26-TYPE ELECTRONIC CONTROLLED PNEUMATIC CONVERSION BLOCK

[75] Inventors: Lawrence M. Kushnir, Jr., North Huntingdon; Ralph Santoro, Jr., New Kensington, both of Pa.

[73] Assignee: Westinghouse Air Brake Company, Wilmerding, Pa.

[*] Notice: This patent is subject to a terminal disclaimer.

[21] Appl. No.: 09/106,697

[22] Filed: Jun. 29, 1998

[51] Int. Cl.[7] .............................. B60T 7/00; B60T 13/00; B60T 15/14
[52] U.S. Cl. .................................. 303/15; 303/7
[58] Field of Search .................. 303/3, 7, 9.61, 303/15

[56] References Cited

U.S. PATENT DOCUMENTS

| | | | |
|---|---|---|---|
| 4,659,149 | 4/1987 | Rumsey et al. | 303/3 |
| 5,039,940 | 8/1991 | Johnson et al. | 324/158 R |
| 5,564,795 | 10/1996 | Engle | 303/9 |

FOREIGN PATENT DOCUMENTS 829 402 A2   3/1998   European Pat. Off. ................ 303/3

Primary Examiner—Robert J. Oberhemier
Assistant Examiner—Robert A. Siconolfi
Attorney, Agent, or Firm—James Ray & Associates

[57] ABSTRACT

A conversion block for converting porting from a brake control valve to an electronic control unit so as to allow for electronic control of an air braking system for a train. This conversion block has particular utility for converting 26 porting and is one part of the entire unit that allows access to 26-Type equipment for the purpose of overlaying features with an electronic controlled pneumatic braking system. The conversion block provides access to porting to allow all of the advantages of electronic controlled braking to take effect such as shorter stopping distances, system performance feedback, and continuous recharging features. The present invention also provides access to the necessary porting through hook-ups on the conversion block so as to perform a single car test of the braking equipment within a remote mounting arrangement of a 26-Type braking system.

22 Claims, 4 Drawing Sheets

26-TYPE ELECTRONIC CONTROLLED PNEUMATIC CONVERSION BLOCK

CROSS-REFERENCE TO RELATED APPLICATIONS

This application is related to co-pending application Ser. No. 09/106,533, entitled "26-Type Electronic Controlled Pneumatics", filed Jun. 29, 1998. This patent application is assigned to the Westinghouse Airbrake Company, the assignee of the present invention and its teachings are incorporated into the present document by reference. This application is also related to co-pending application Ser. No. 106,536, entitled "26-Type Electronic Controlled Pneumatics Access Plate", filed Jun. 29, 1998 and is also assigned to the assignee of the present invention.

FIELD OF THE INVENTION

The present invention relates, in general, to railway vehicle brake equipment and, more particularly, the present invention is directed to a system which allows for the conversion of porting to an electronic controlled pneumatic portion for train braking systems. In particular, the present invention is directed to a system which allows for the conversion of 26 porting to an electronic controlled pneumatic portion for 26-Type train braking systems. The present invention also provides a means for accessing the necessary porting involved with doing a single car test within a braking arrangement, particularly, within a 26-Type braking arrangement. This means for accessing the necessary porting for performing a single car test can also be used in a remote mounting arrangement on a laminated system setup.

BACKGROUND OF THE INVENTION

A "26-L" air brake system is an equipment package which has been designed to meet present day train handling requirements. This system uses air, under pressure, for the braking of locomotives and trailing freight or passenger vehicles. This system has been designed and developed by the Westinghouse Airbrake Company (WABCO), the assignees of the present invention.

A "26-L" system can include either a "26-C" air brake control valve or a "26-F" air brake control valve as the primary controlling device in this equipment arrangement. These valves provide the manual means for initiating air brake application and releases.

The "26-C" valve is used for passenger locomotives and cars. The "26-F" valve is used for locomotives which haul freight. The present invention can be applied to either the "26-C" or the "26-F" system and thus the term 26-Type is meant to encompass either of these braking systems.

The 26-Type braking system relies on the transfer of air down the train, which propagates at a certain time frame, to achieve stopping of the train. This type of braking system has several disadvantages. One disadvantage of the system is the requirement of the train to have a long enough stopping distance to compensate for the time it takes for the air to be transferred down the train. Also, care must be taken to ensure that the air supply has been sufficiently replenished after a brake application or a series of brake applications prior to another brake application. Additionally, this currently used 26-Type braking system is limited in the number of units that may be placed within a train consist because of the system's inability to react quickly to reductions at the lead unit over long distances.

A system for electronically controlling the pneumatics of the 26-Type braking system which overcomes the disadvantages of the currently used 26-Type braking systems is the subject of the aforementioned co-pending application entitled "26-Type Electronic Controlled Pneumatics".

There is not an industry invention that allows 26 porting to be converted to an electronic controlled pneumatic portion in any manner. Other types of electronic controlled pneumatic equipment are in the marketplace, however, none have been specifically applied to 26-Type braking systems which allow for the graduated release of brake cylinder pressure.

The present invention is directed to a conversion block which provides access to this porting to allow for electronic controlled braking of 26-Type braking systems.

Additionally, there is not an industry product that allows an automated single car test device to be placed within a 26-Type braking arrangement. The present invention provides a single car automated test arrangement, as part of the conversion block, for systems that are mounted in a laminated arrangement. In this sense, the conversion block of the invention provides a means of accessing 26-Type porting from a remotely mounted location, through pipe or related tubing.

SUMMARY OF THE INVENTION

An object of the present invention is to provide a means for allowing porting to be converted to an electronic controlled pneumatic portion. The present invention is particularly directed to converting 26 porting for 26-Type train braking systems.

Another object of the present invention is to provide a means for accessing 26-Type porting from a remotely mounted location, through pipe or related tubing.

The conversion block of the present invention achieves these objects by connecting ports from an access plate and allowing air from this access plate to be transferred to a standard electronic unit. The primary function of this electronic controlled unit is to make brake applications. The conversion block will allow for access to the following porting through the access plate: control reservoir, auxiliary reservoir, brake pipe, 16 pipe, 10 pipe, and 16 pipe release.

Another object of the present invention is to provide a means for accessing the necessary porting involved with doing a single car test for a remote mounting arrangement in a laminated system setup for a 26-Type braking system. This object is accomplished by providing hook-ups directly on the conversion block in an easily accessible location. This will allow an operator to test the braking feature of the control valve of a single car.

The conversion block of the present invention provides access to porting to allow all of the advantages of electronic controlled pneumatic braking to take effect including shorter stopping distances, system performance feedback, and continuous recharging features.

DETAILED DESCRIPTION OF THE INVENTION

Figure 1:
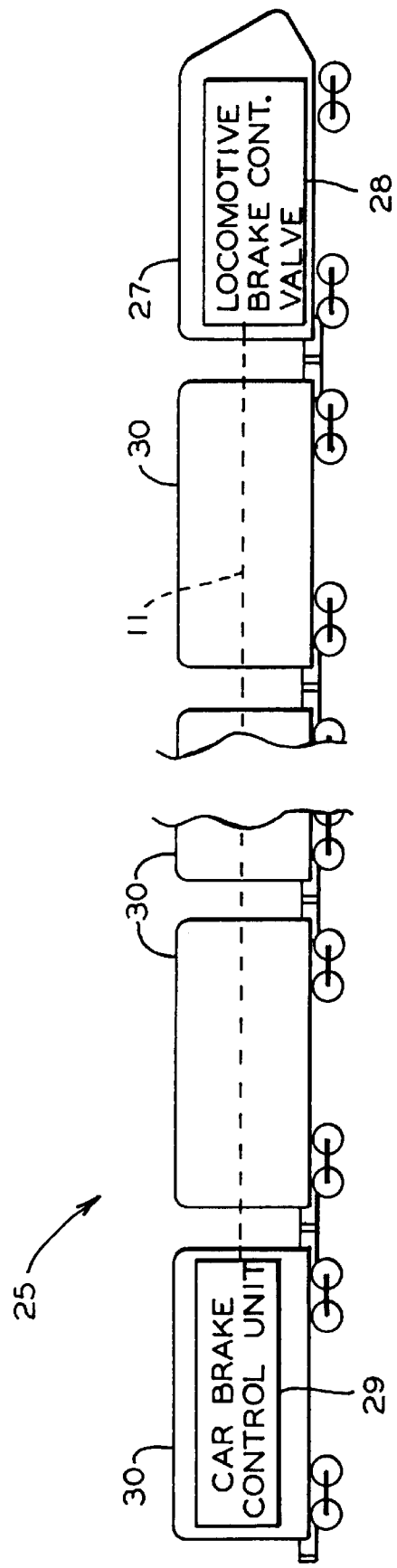
FIG. 1 shows an overview of an intratrain communication system for the movement of information throughout a train consist.

FIG. 1 shows an intratrain communication system for the movement of information throughout a train consist 25 comprising a locomotive 27 having a locomotive brake control valve 28 and a plurality of cars 30, at least one of which includes an electronic controlled pneumatic (ECP) car control unit 29. The locomotive brake control valve 28 feeds communication signals to the car brake control unit 14 via an intratrain communication system 11. This intratrain communication system communicates information, such as a brake application or brake release command, via radio or electric current signals or any well known communicating means.

The present invention is directed to a conversion block which is one part of the entire unit that allows access to 26-type equipment for the purpose of overlaying features with an electronic controlled pneumatic braking system.

Figure 2:
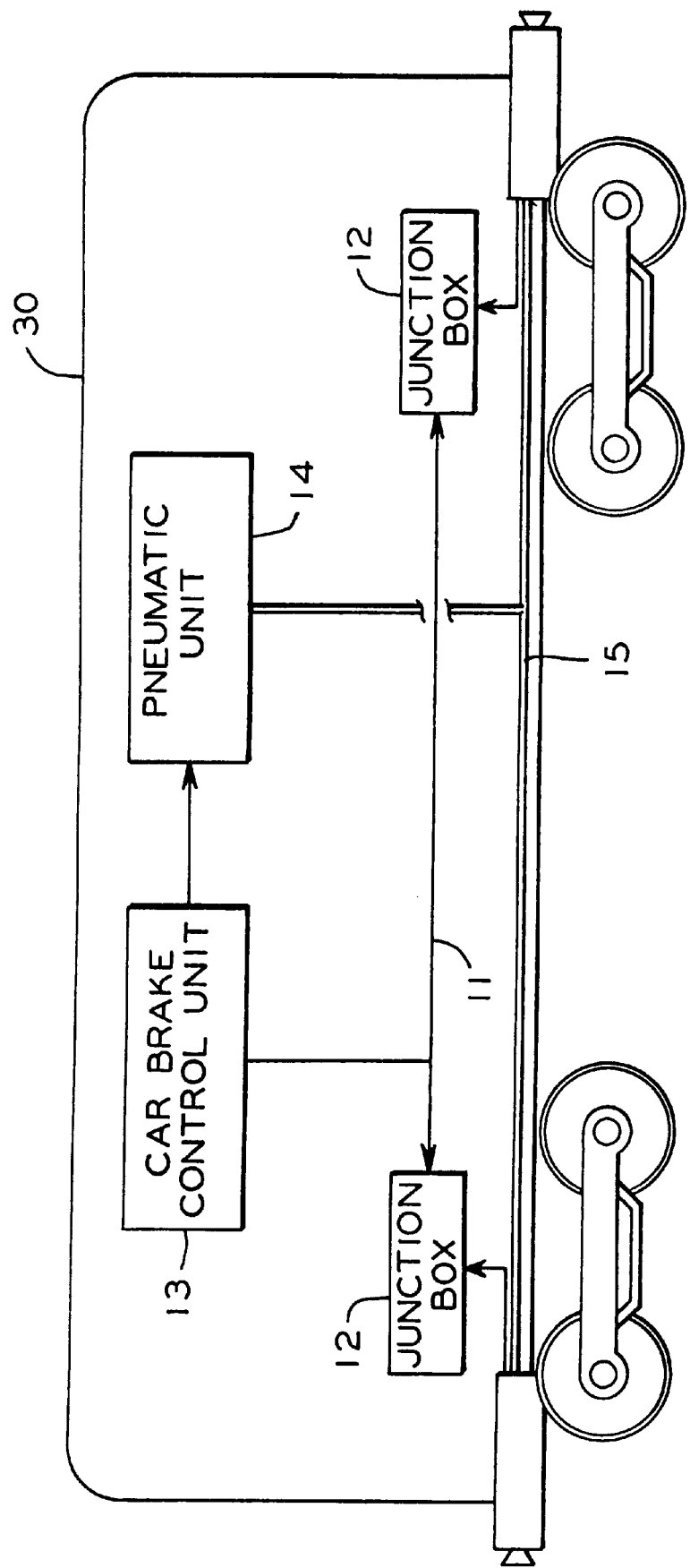
FIG. 2 shows an overview of an electronic controlled pneumatic passenger car system.

FIG. 2 shows a single passenger car 30 within a train consist including the individual components for electronically controlling the air brake cylinders of the car. Typically each car 30 within the train consist 25 will include these components, however, this system may be designed such that these components would not be required on every car. This may be the case, for example, on cars which are connected together in a semi-permanent manner and would only be disconnected for repairs. The car 30 includes trainline or intratrain communication means 11 for transmitting at least brake application and/or brake release communications down the train. Note that other types of communications may be transmitted along this intratrain communication means. Junction boxes 12 are located at each end of the car 30 to receive at least these brake application and/or brake release communications from the intratrain communication line 11 and to convert these communication signals to an acceptable input level, such as by dropping the voltage level, so that they may be fed to the ECP (electronic controlled pneumatic) car control unit 13. The ECP car control unit 13 may also be referred to as the central control unit. This unit holds the software for controlling the pneumatic unit or valve 14 as well as many electronics transfer features for the system. The pneumatic unit 14 contains electropneumatic and pneumatic valves which react to the electronic signals sent from the ECP car control unit 13 and delivers the final input pressure via the brake pipe 15 to the car brake cylinders, based upon this signal.

The electronic controlled pneumatic braking system may be applied to either a standard braking system or to a relayed system. A relayed system requires the provision of a relay valve 21, such as a J-Relay, to discharge the output pressure from the pneumatics unit or valve 14 to the brake cylinder, whereas in a standard system, the output pressure is fed directly from the pneumatics valve 14. A relayed system is used when longer cars are used in the train.

Figure 3:
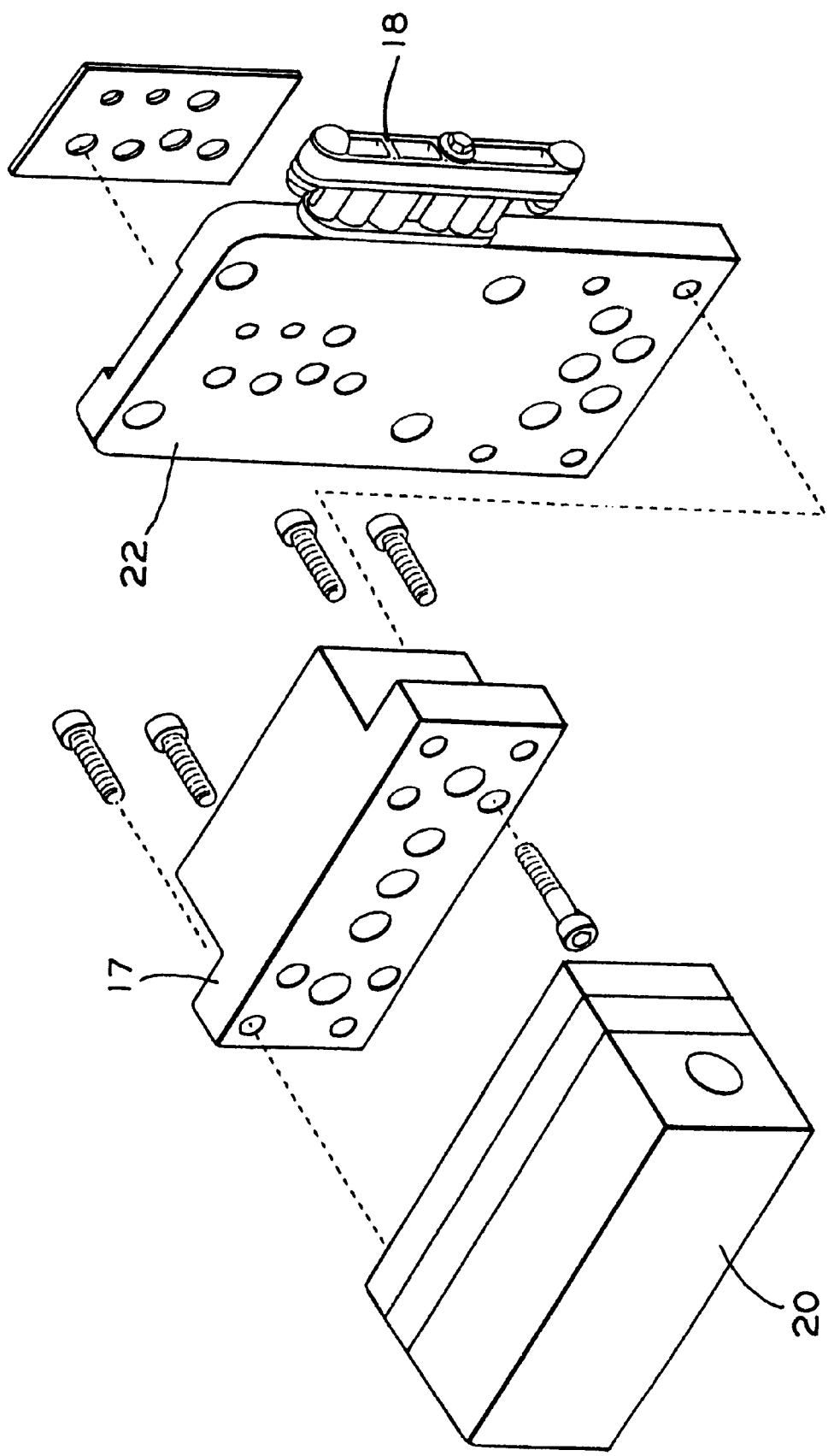
FIG. 3 shows a conversion block arrangement of the present invention which is to be used in an electronic controlled pneumatic braking system.

FIG. 3 shows a conversion block arrangement of the present invention which is to be used in an electronic controlled pneumatic braking system. A standard electronics box assembly or an electronic control unit 20 is connected to a conversion block 17. It is the standard electronic box assembly 20 which allows for electronic control of the brake application. The conversion block 17 is also connected to an access plate 22. The access plate 22, also referred to as an adapter plate, provides access to the porting for the control reservoir, the auxiliary reservoir, the brake pipe, the 16 pipe, the 10 pipe, and the 16 pipe release. The conversion block 17 converts these ports from the access plate 22 to the electronics box assembly 20.

The access plate 22 also provides a means to access the necessary porting involved with doing a single car test of the car braking equipment. A cover plate is removed from a side of the access plate 22 to expose porting 18 from which a single car test device can be hooked-up to the access plate 22.

Figure 4:
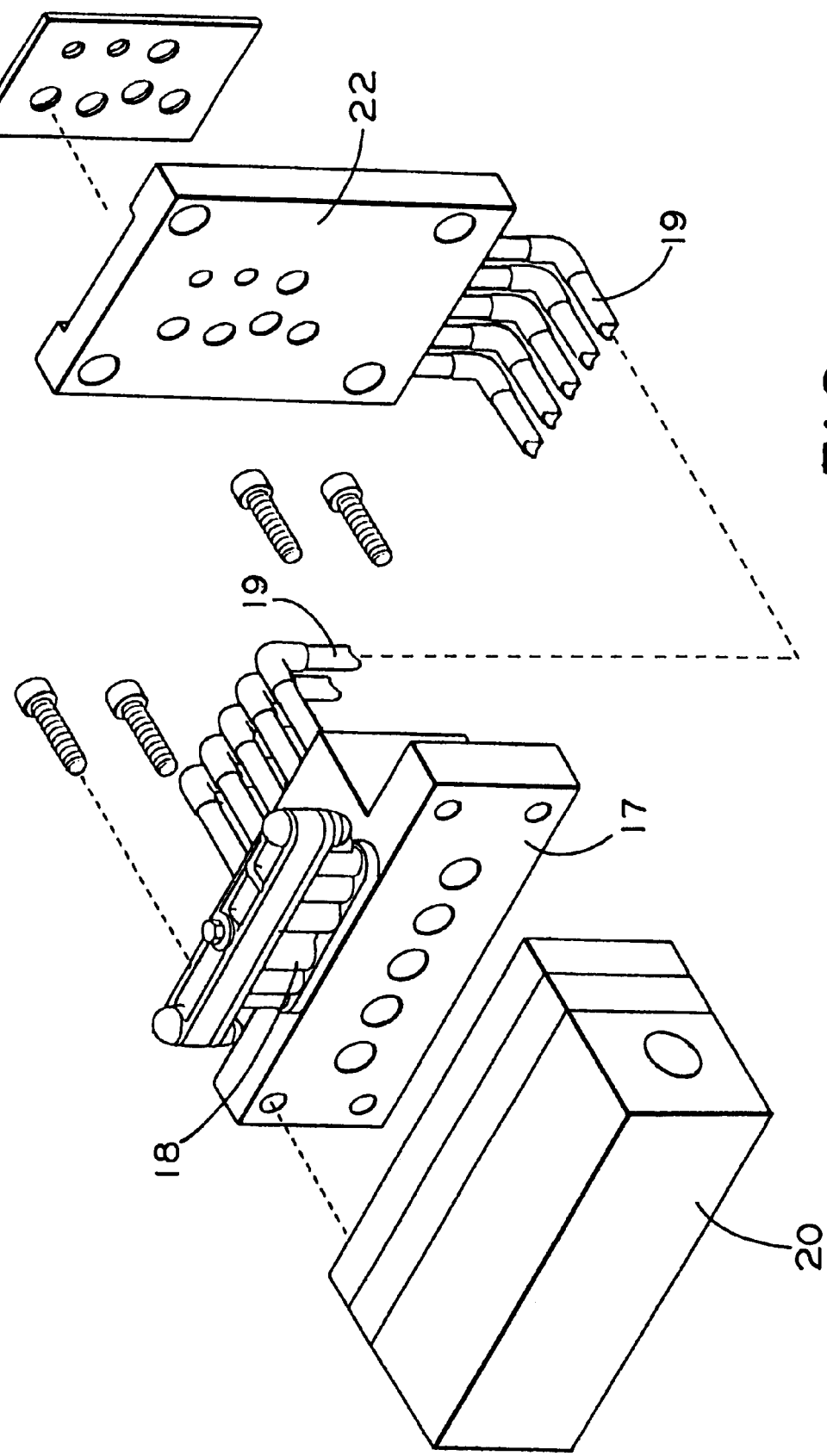
FIG. 4 shows a conversion block arrangement of the present invention for use in a remote mounting arrangement on a laminated system setup which is to be used in an electronic controlled pneumatic braking arrangement.

FIG. 4 shows a conversion block arrangement of the present invention for use in a remote mounting arrangement on a laminated system setup. Components having identical functions as have been described in FIG. 3 will be represented by the same reference numeral. FIG. 4 shows pipe or tubing 19 between the conversion block 17 and the access or adapter plate 22. Through this piping or tubing 19, the access plate can facilitate connections with other apparatuses which are not directly connected to the unit. The conversion block 17 enables the conversion of these ports to the electronics box assembly 20.

Also, in the remote mounted arrangement, the conversion block 17 provides a means for accessing porting 18 required to do single car brake testing of the equipment. A cover plate is removed from a side of the conversion block 17 to expose porting 18 from which a single car test device can be hooked up and a test of the braking features of the car control valve can be completed.

The conversion block of the present invention provides access to porting to allow for electronic control of 26-Type braking systems. Electronic control of 26-Type braking systems has advantages over currently used 26-Type braking systems in that it allows for an almost instantaneous application of the brakes to all of the units in the train consist, thus reducing stopping distances. The 26-Electronic Controlled Pneumatics (ECP) system also creates a replenishable supply source of air since the transfer medium is through the electronics and not the pneumatics. Another advantage of electronic controlled pneumatics of the 26-Type braking systems is that it allows for trainline communication features to be built into the system. Also, an unlimited number of units may be placed within a train consist as the electronic communication capabilities of the system would allow for the units to react quickly to a reduction at the lead unit. This would result in significant economic advantages.

Thus, the present invention has been described in such full, clear, concise and exact terms as to enable any person skilled in the art to which it pertains to make and use the same. While the present invention has been described in relation to its use on a passenger car, note that this system is not limited to this use and may be applicable to other types of cars within a train consist, particularly ones that utilize 26-Type Type braking control systems. It will be understood that variations, modifications, equivalents and substitutions for components of the specifically described embodiments of the invention may be made by those skilled in the art without departing from the spirit and scope of the invention as set forth in the appended claims.

What is claimed is:

1. A system for converting control ports from an access source to an electronic controlled unit in a 26-Type air braking system in a train, such train including at least one locomotive and at least one car, said system comprising:

(a) a locomotive 26-Type air brake control valve disposed on such at least one locomotive for controlling an application and release of brakes disposed on such at least one locomotive and for feeding brake application and brake release communication signals, said air brake control valve capable of achieving a graduated release of said brakes;

(b) an electronic controlled pneumatic car control valve placed on at least one such car for receiving at least said brake application and brake release communication signals, said car control valve including porting;

(c) an access plate associated with said electronic controlled pneumatic car control valve, said access plate including ports for accessing said porting of said car control valve; and (d) a conversion block associated with said access plate for converting said ports from said access plate to an electronic controlled unit so as to achieve electronic control of such car control valve.

2. A system for converting control ports from an access source to an electronic controlled unit in a 26-Type air braking system in a train, such train including at least one locomotive and at least one car, said system comprising:

(a) an electronic controlled pneumatic car control valve placed on at least one such car for receiving at least a brake application and a brake release communication signal from such locomotive, said car control valve including porting, said electronic controlled pneumatic car control valve being capable of responding to a graduated release signal from such locomotive;

(b) an access plate including ports which access porting of such car control valve; and (c) a conversion block associated with said access plate for converting said ports from said access plate to an electronic controlled unit so as to achieve electronic control of such car control valve.

3. A system as recited in claim 2 wherein said porting of said car control valve comprises porting for a control reservoir, an auxiliary reservoir, a brake pipe, a 16 pipe, a 10 pipe, and a 16 pipe release.

4. A system as recited in claim 2 wherein said electronic controlled unit controls brake application.

5. A system as recited in claim 2 wherein said access plate includes hook-up ports from which single car testing may be performed.

6. A system as recited in claim 2 wherein said conversion block is positioned in a remote mounting arrangement and a plurality of pipe or tubing is provided between said conversion block and said access plate.

7. A system as recited in claim 6 wherein said conversion block includes hook-up ports from which single car testing may be performed.

8. A conversion block for converting control ports from an access source to an electronic controlled unit in a 26-Type air braking system in a train comprising:

a conversion block positioned between an access plate and an electronic control unit wherein said conversion block includes ports therein which line up with ports on said access plate and converts said access plate ports so that they may be connected with said electronic control unit.

9. A conversion block as recited in claim 8 wherein said access plate provides connection to ports located on a brake control valve.

10. A conversion block as recited in claim 9 herein said brake control valve is compatible for use with a locomotive 26-Type air brake control valve.

11. A conversion block as recited in claim 8 wherein said conversion block is positioned in a remote mounting arrangement and a plurality of pipe or tubing is provided between said conversion block and said access plate.

12. A conversion block as recited in claim 11 wherein said conversion block includes hook-up ports thereon which allow for single car testing.

13. A conversion block as recited in claim 8 wherein said porting accessed and converted comprises porting for a control reservoir, an auxiliary reservoir, a brake pipe, a 16 pipe, a 10 pipe, and a 16 pipe release.

14. A system for performing single car brake testing for a remote mounting arrangement in an electronically controlled 26-Type air braking system in a train comprising:

(a) a conversion block including single car testing hook-up ports thereon;

(b) tubing extending from said conversion block; and (c) an access plate connected to said tubing for providing a pneumatic connection with said conversion block and for providing access to porting on a brake control valve so that a single car test of said brake control valve may be performed from said hook-up ports on said conversion block.

15. A system for performing single car brake testing in an electronically controlled 26-Type air braking system as recited in claim 14 wherein said access plate provides access to porting for a control reservoir, an auxiliary reservoir, a brake pipe, a 16 pipe, a 10 pipe, and a 16 pipe release.

16. A system as recited in claim 2 wherein said control valve is one of a 26C and 26F control valve.

17. A conversion block as recited in claim 10 wherein said control valve is one of a 26C and 26F control valve.

18. A system for performing single car brake testing in an electronically controlled 26-Type air braking system as recited in claim 14 wherein said brake control valve is one of a 26C and 26F brake control valve.

19. A system for converting control ports from an access source to an electronic controlled unit in an air braking system in a train, such train including at least one locomotive and at least one car, said system comprising:

(a) an electronic controlled pneumatic car control valve placed on at least one such car for receiving at least a brake application and a brake release communication signal from such locomotive, said car control valve including porting;

(b) an access plate including ports which access porting of such car control valve; and (c) a conversion block positioned in a remote mounting arrangement and associated with said access plate via a plurality of pipe or tubing, said conversion block converting said ports from said access plate to an electronic controlled unit so as to achieve electronic control of such car control valve.

20. A system as recited in claim 19 wherein said conversion block includes hook-up ports from which single car testing may be performed.

21. A conversion block for converting control ports from an access source to an electronic controlled unit in an air braking system in a train comprising:

a conversion block positioned in a remote mounting location and associated with an access plate via a plurality of piping or tubing, said conversion block being associated with an electronic control unit wherein said conversion block includes ports therein which line up with ports on said access plate and converts said access plate ports so that they may be connected with said electronic control unit.

22. A conversion block as recited in claim 21 wherein said conversion block includes hook-up ports thereon which allow for single car testing.

* * * * *